UNITED STATES PATENT OFFICE.

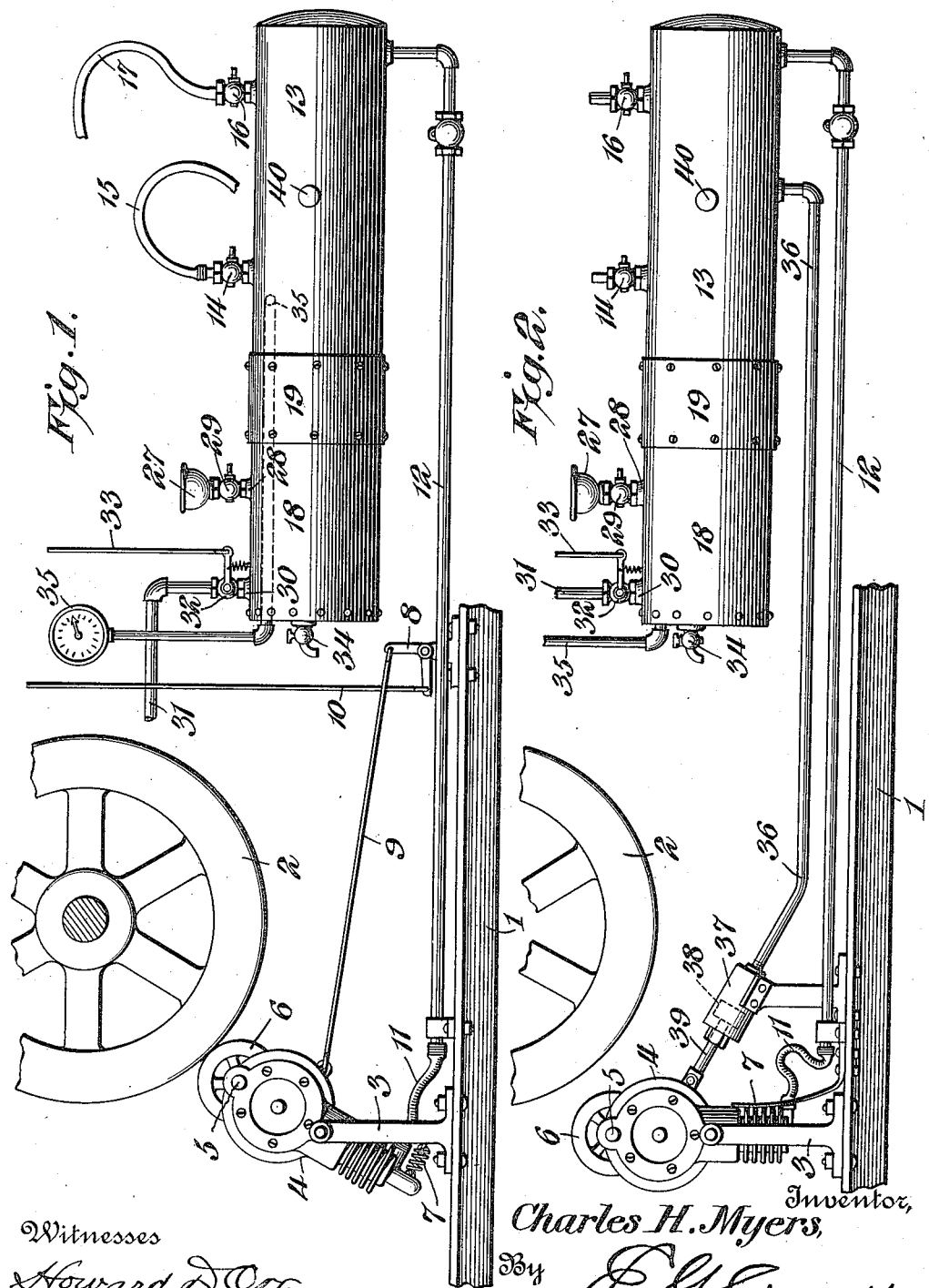

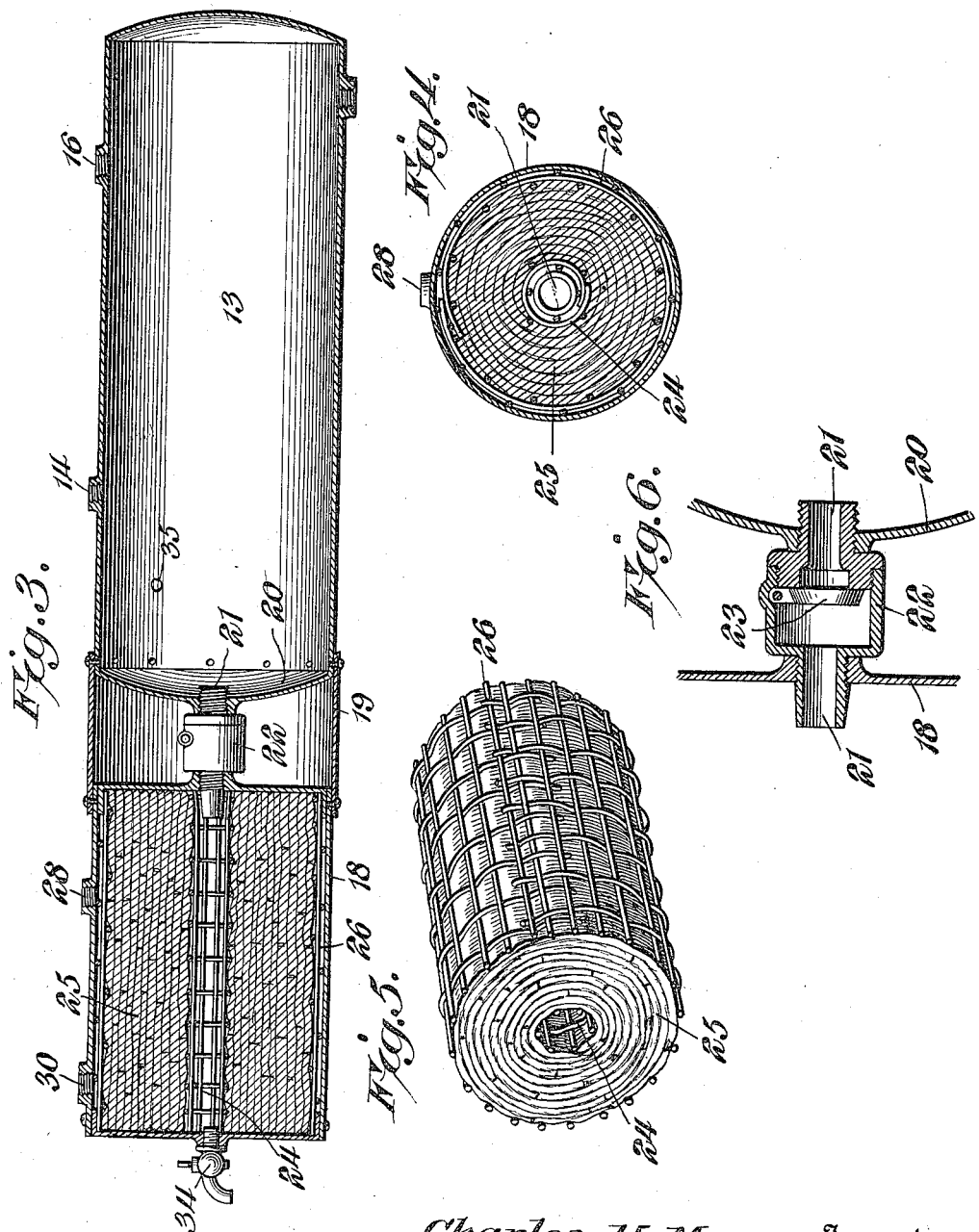

CHARLES H. MYERS, OF BUFFALO, NEW YORK.

ENGINE-STARTER.

1,080,772.  Specification of Letters Patent.  Patented Dec. 9, 1913.

Application filed February 24, 1910, Serial No. 545,777. Renewed March 8, 1913. Serial No. 753,075.

*To all whom it may concern:*

Be it known that I, CHARLES H. MYERS, a citizen of the United States, residing at Buffalo, in the county of Erie and State of New York, have invented a new and useful Engine-Starter, of which the following is a specification.

This invention has for its object the provision of simple mechanism by the use of which an explosive engine may be started without great manual labor, and by which the operation of inflating automobile tires may be performed in a substantially automatic manner. Such an apparatus is illustrated in the accompanying drawings, and the invention consists in certain novel features thereof which will be hereinafter first fully described and then particularly pointed out in the appended claims.

In the drawings, Figure 1 is an elevation of an apparatus embodying my invention, showing the air pump in its operative position. Fig. 2 is a similar view showing the air pump in its inoperative position, and showing a modification of the device by which the air pump is thrown into and out of its operative position automatically. Fig. 3 is a central longitudinal section of the tank. Fig. 4 is a transverse section of the same. Fig. 5 is a detail perspective view of the cartridge or holder for the volatile fluid. Fig. 6 is a detail longitudinal section of the connection between the two sections or members of the tank.

My invention is intended more particularly for use upon automobiles, and in the drawings a portion of the automobile frame is indicated at 1, while at 2 is shown the fly wheel of the engine by which the automobile is propelled, the construction of the engine forming no part of my invention and the illustration of the same being unnecessary to an understanding of my improvements.

At a point upon the frame 1 adjacent to the engine, I erect a standard 3 and on the upper end of the said standard I pivotally mount an air pump 4 which may be of any ordinary type provided with a driving shaft 5 equipped with a wheel 6 adapted to frictionally engage the periphery of the engine fly wheel 2, as shown in Fig. 1, and thereby impart motion to the air pump. The pump is normally held in its inoperative position, out of engagement with the engine fly wheel, by a spring 7 secured to the lower end of the pump and the standard or bracket 3, as clearly shown, and in order to swing the pump into its operative position in engagement with the engine fly wheel, I provide a bell crank lever 8 on the frame 1 connected, by a link 9, with the pump and also connected to a link or operating rod 10 which extends up to a point convenient to the operator. The discharge end of the pump communicates through a flexible tube 11 and a pipe 12 with a tank 13, and this tank is provided with a valve 14 having attached thereto a hose 15 adapted to engage a tire valve when inflation of a tire is necessary, and also with a valve 16 which may communicate through a hose 17 with the horn ordinarily provided on an automobile.

The tank 13 is illustrated in the drawings as connected to a generator or carbureter 18 by a coupling sleeve 19, but it would obviously not be a departure from this construction to form the generator or carbureter and the tank in one structure having the two compartments separated by an internal partition corresponding to the head 20 of the tank 13. A conduit 21 leads from the end of the chamber or tank 13 to the generator or carbureter 18, and within this conduit is provided a valve casing 22 containing a check valve 23 arranged to open toward the generator or carbureter and thereby permit the flow of compressed air from the reservoir or tank 13 to the generator or carbureter but prevent the flow in the opposite direction. The end of the conduit 21, within the generator or carbureter, discharges into a cylindrical cage 24 disposed centrally within the generator or carbureter, and around this cage is wrapped an absorbent body or cartridge 25 consisting preferably of woven wicking. This cartridge is surrounded by an outer woven wire cage 26 which serves to hold the absorbent body in proper shape and also serves to space the same slightly from the wall of the generating chamber in order that the flow of hydrocarbon or other fluid into the chamber and the escape of generated gas therefrom may take place readily and without liability of the inlet and outlet ports being clogged by the wicking. To facilitate the charging of the cartridge or the generating chamber, a filling cup 27 is provided on the upper side of the tank and this filling cup communicates with the inlet port 28 through a cut-off valve 29, as will be readily understood. An outlet port 30 is also provided in the tank and this port communicates through a pipe 31 with the combustion chamber of the engine, the said pipe being equipped with a cut-off valve 32 having a normal tendency toward the closed position and from which an operating rod 33 extends to a point within convenient reach of the operator. A drain valve or drip-cock 34 is provided in the end of the tank to serve as an escape for the surplus fluid when the generator is being charged so that the operator may know when the necessary quantity of fluid has been poured into the generator. This drain valve communicates with the central cage 24 of the cartridge, and if the same be open when the generator is being charged, the surplus fluid which is not absorbed by the wicking will pass through the said drain valve and, by its escape, notify the operator that the generator is fully charged. A gage 35 is mounted on the tank to indicate the pressure therein and this gage should be so disposed that it may be readily read at all times by the operator. Should the gage indicate that the pressure within the tank has fallen below normal, the operating rod 10 will be drawn upward to the position shown in Fig. 1, and thereby actuate the bell crank lever 8 and the link 9 so as to draw the air pump friction wheel 6 into its operative engagement with the fly wheel of the engine and set the pump in motion. The operation of the engine will, consequently, cause the pump to force air into the tank 13 until the pressure has been restored to the desired point.

In Fig. 2, I have illustrated a modification in which the spring 7 serves to throw the air pump into engagement with the engine fly wheel, thus acting in a manner the reverse of the spring in the arrangement illustrated in Fig. 1. A pipe 36 leads from the reservoir or tank 13 to a cylinder 37 adjacent the pump, and in the said cylinder is mounted a piston 38 connected by a piston rod 39 with the air pump so that the air passing from the tank or reservoir 13 through the pipe 36 tends to throw the said piston outward and, consequently, hold the air pump out of engagement with the engine fly wheel, as illustrated. The spring 7 will be set to a certain pressure, and as long as the pressure in the tank is equal to or exceeds that to which the spring has been adjusted, the pump will be held to its inoperative position. When, however, the pressure in the tank falls below that predetermined normal point, the spring will be free to act and will throw the pump into engagement with the fly wheel of the engine so that the pump will be operated and the pressure in the tank restored.

It will be understood, of course, that an initial pressure must be created within the storage tank 13 and this pressure may be supplied in a few minutes by an ordinary hand-operated air pump. To facilitate the application of such a hand pump, I show a nipple 40 on the side of the tank to which the pump may be attached. After this initial supply of compressed air has been created within the tank, no further use of the hand pump will be required as the subsequent operation of the apparatus will be entirely automatic, the only attention required from the chauffeur or other attendants being the re-charging of the cartridge occasionally with a volatile fluid.

The operation of the device will be readily understood from the foregoing description. The cartridge or generator chamber is charged with a hydrocarbon or other volatile fluid through the filling cup 27 and its attached parts, and the compressed air within the storage tank 13 will flow through the conduit 21 into the generator chamber and will vaporize the fluid within the generating chamber so as to create a supply of gas corresponding in all respects to the usual gas fed to the combustion chamber of the engine. When it is desired to start the engine, it is only necessary to operate the rod 33 so as to open the valve 32 and admit a single charge through the pipe 31 to the engine, the valve turning automatically to its closed position when the rod 33 is released. This charge may be ignited within the combustion chamber in the usual manner, or permitted, by its expansion, to initially move the engine piston. This operation may be repeated, if necessary, until the engine takes up its usual feed. Usually a single charge will be sufficient and the failure of the engine to start on a single charge will ordinarily indicate that the supply of gas has been exhausted and uncharged compressed air is passing to the engine. The amount of gas drawn from the generator chamber in starting the engine will be comparatively slight and, consequently, a single charging of the generator will last for a considerable period of time.

The device is extremely simple in its construction and the arrangement of its parts and occupies but a small space while its many advantages in obviating the necessity of cranking the engine when the same has been temporarily stopped will, it is thought, be readily appreciated. The woven wire cages by which the absorbent body or cartridge is held serve to maintain the shape of the same and thereby facilitate the insertion of the same into the generator chamber. When it is necessary to inflate a tire, the only labor required is to fit the end of the hose 15 over the tire valve and then open the valve 14. The tire, having been inflated, the valve 14 is closed and the hose 15 disconnected.

While the device is intended especially for use on automobiles, it can be advantageously employed for starting any type of explosive engine wherever the same may be located.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, and desire to secure by Letters Patent, is:—

1. A starter for explosion engines comprising an elongated reservoir for compressed air, a carbureter structure in axial alinement therewith and comprising a casing connected to one end of the compressed air reservoir, said carbureter casing being provided with an annular cartridge having inner and outer walls of reticulate material and a filler of fibrous material between said walls, an axially located conduit connecting the compressed air reservoir with the interior of the carbureter cartridge and including a one-way check valve opening toward the carbureter, means for the introduction of hydro-carbon liquid into the carbureter exterior to the cartridge, and a valved conduit leading from the carbureter casing for connection with the intake of the engine to be started.

2. A starter for explosion engines comprising an elongated container having one end formed into a reservoir for compressed air and at the other end a cartridge of absorbent material having a passage therethrough defined by an axially extended reticulated cage and the exterior of the absorbent material being confined by a reticulated cage adapted to space the absorbent material from the inner walls of the container, means for establishing one-way constant communication between the compressed air reservoir and the inner cage of the cartridge, means for the introduction of liquid hydro-carbon into the portion of the container inclosing the cartridge, and a conduit leading from the last named portion of the container and adapted to be connected to the intake of the explosion engine to be started.

3. A starter for explosion engines comprising an elongated container having one end formed into a reservoir for compressed air and at the other end a cartridge of absorbent material having a passage therethrough defined by an axially extended reticulated cage and the exterior of the absorbent material being confined by a reticulated cage adapted to space the absorbent material from the inner walls of the container, means for establishing one-way constant communication between the compressed air reservoir and the inner cage of the cartridge, means for the introduction of liquid hydro-carbon into the portion of the container inclosing the cartridge, and a conduit leading from the last named portion of the container and adapted to be connected to the intake of the explosion engine to be started, the said last named portion of the container being also provided with a controllable outlet in line with the inner cage.

4. In a starter for automobiles, a unitary member comprising an elongated casing with a compressed air reservoir in one end, a cartridge of absorbent material in the other end, means for the introduction of liquid hydrocarbon to the cartridge, and a one way valve structure constituting the only means of communication between the air reservoir and the end of the casing containing the cartridge, said last named end of the casing having means for the outflow of enriched air.

5. In a starter for automobiles, a unitary member comprising an elongated casing with a compressed air reservoir in one end, a cartridge of absorbent material in the other end, and a one way valve structure constituting the only means of communication between the air reservoir and the end of the casing containing the cartridge, said last named end of the casing having means for the outflow of enriched air, and controllable means for the introduction of liquid hydro-carbon to the cartridge, the means for the outflow of air including a valve with means constraining the valve normally to the closed position, and means for the manual operation of said valve to the open position.

6. In an engine starter for automobiles, an elongated casing having in one end a compressed air reservoir and in the other end containing a cartridge of fibrous material having a central passage therethrough, a one-way valve constituting the sole means of communication between the air reservoir and the central passage through the cartridge. a drain cock also communicating with said central passage, controllable means for the introduction of liquid hydro-carbon to the cartridge, and an outlet for enriched air communicating with the end of the casing containing the cartridge, said outlet being provided with a valve controllable at will and having a normal tendency toward the closed position.

In testimony, that I claim the foregoing as my own, I have hereto affixed my signature in the presence of two witnesses.

CHARLES H. MYERS.

Witnesses:
 JOHN H. SIGGERS,
 DAVID R. WAGNER.

Copies of this patent may be obtained for five cents each, by addressing the "Commissioner of Patents, Washington, D. C."